United States Patent [19]

Carlson

[11] 4,272,646
[45] Jun. 9, 1981

[54] BUS CONDUIT ELECTRICAL DISTRIBUTION SYSTEM

[75] Inventor: Elmer T. Carlson, Port St. Lucie, Fla.

[73] Assignee: Broadhill Development Corporation, Farmington, Conn.

[21] Appl. No.: 151,460

[22] Filed: May 19, 1980

Related U.S. Application Data

[63] Continuation-in-part of Ser. No. 877,595, Feb. 15, 1978, Pat. No. 4,213,003, which is a continuation-in-part of Ser. No. 755,446, Dec. 29, 1976, Pat. No. 4,112,249, which is a continuation-in-part of Ser. No. 554,684, Mar. 3, 1975, Pat. No. 4,008,365.

[51] Int. Cl.³ .............................................. H02G 5/08
[52] U.S. Cl. .................................................. 174/88 B
[58] Field of Search .......................... 174/68 B, 88 B

[56] References Cited

U.S. PATENT DOCUMENTS

| | | | |
|---|---|---|---|
| 3,786,394 | 1/1974 | Koenig et al. | 174/88 B X |
| 4,009,920 | 3/1977 | Hicks, Jr. et al. | 174/88 B X |

Primary Examiner—Laramie E. Askin
Attorney, Agent, or Firm—Eugene Chovanes; Edward Lovett Jackson

[57] ABSTRACT

The bus bars inside the protective conduit sheathing are on a number of different levels, one for each phase. They lie flat with the wide cross-sectional dimensions horizontal and side-by-side to each other in a plurality of groups of preferably three segments each. Within each group there is preferably insulation around each of the three bus bars and each group of three has insulation around it as a group. Within the joint box, the bared ends of the bus bars stop on a line substantially short of the bared ends of the next set of bus bars and a single conductive plate of thickness the same as that of each of the bus bars, which are themselves of the same thickness to each other, spans the gap between the bus bars connecting the two sets of bus bars to each other. A hole in the center of the connector and between the ends of the bus bars is in registry with holes in insulating plates between the bus bars and outside of them, and these insulating plates have interfitting concentric rings—one protruding in one direction and a pair protruding in the other direction into which the first interfits, to provide a suitable extended insulation path, at the same time also aiding assembly by their registry. A single bolt passes through the entire setup at this hole by means of the hole and joins everything together with the use of one nut.

1 Claim, 6 Drawing Figures

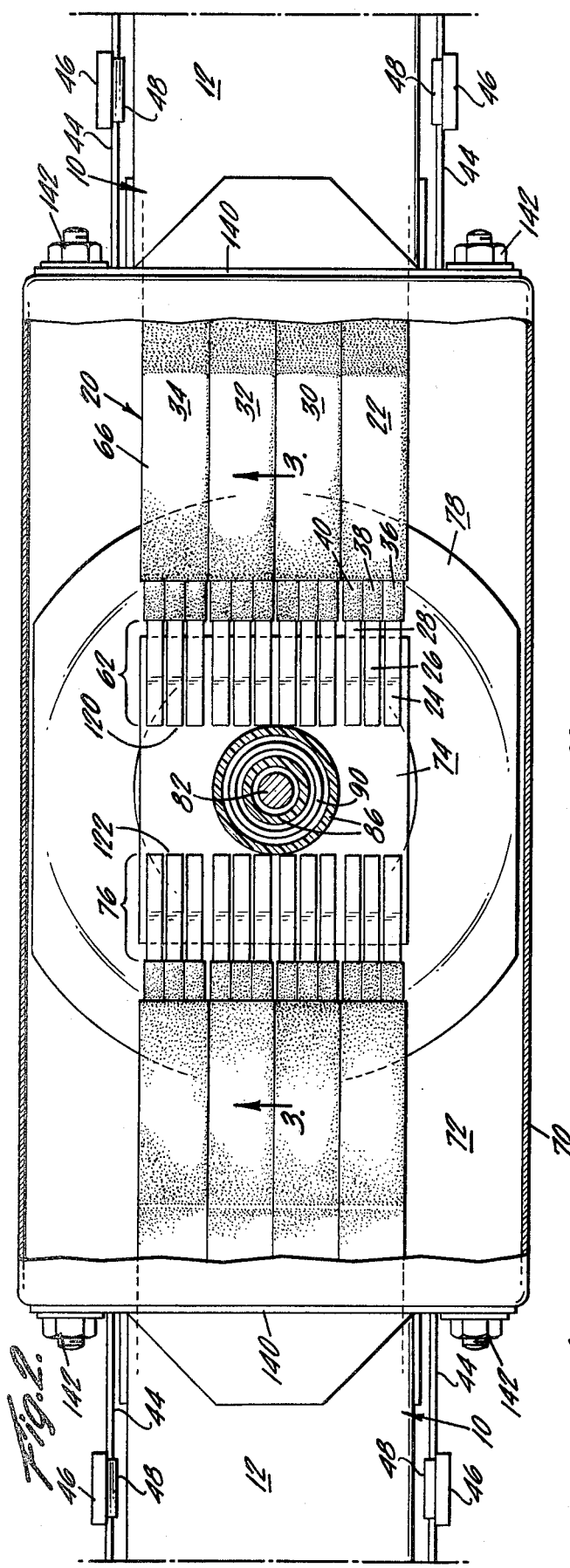
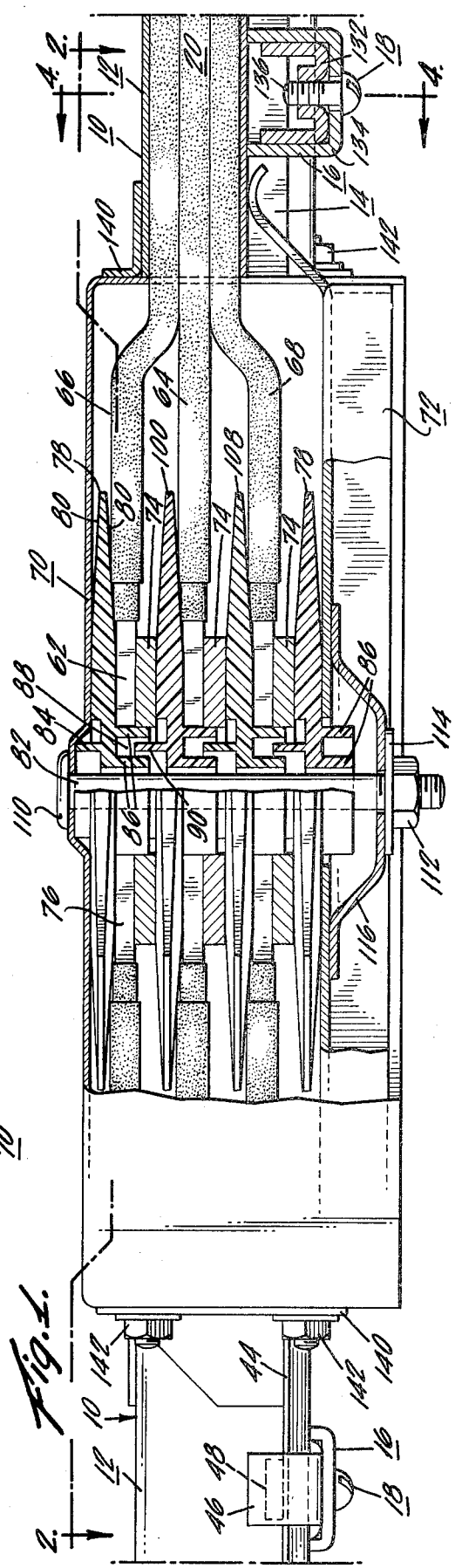
Fig. 1.
Fig. 2.

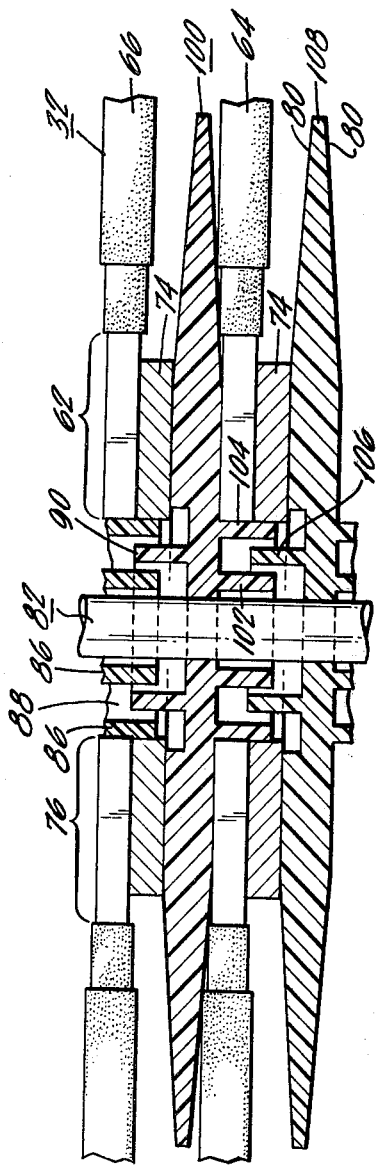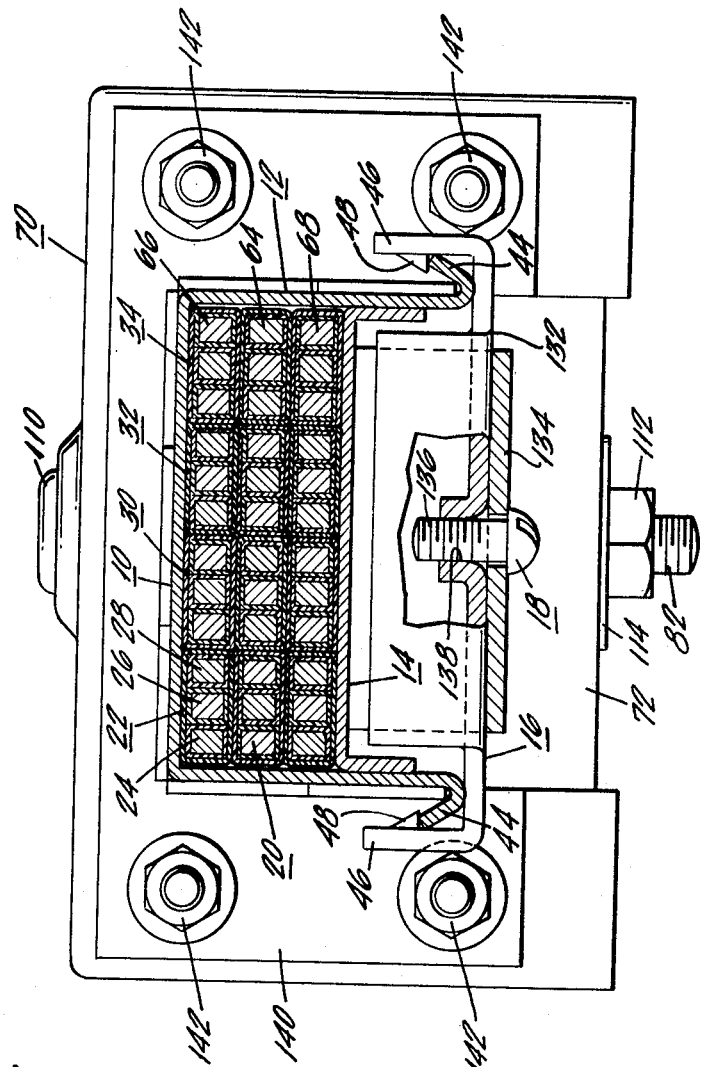

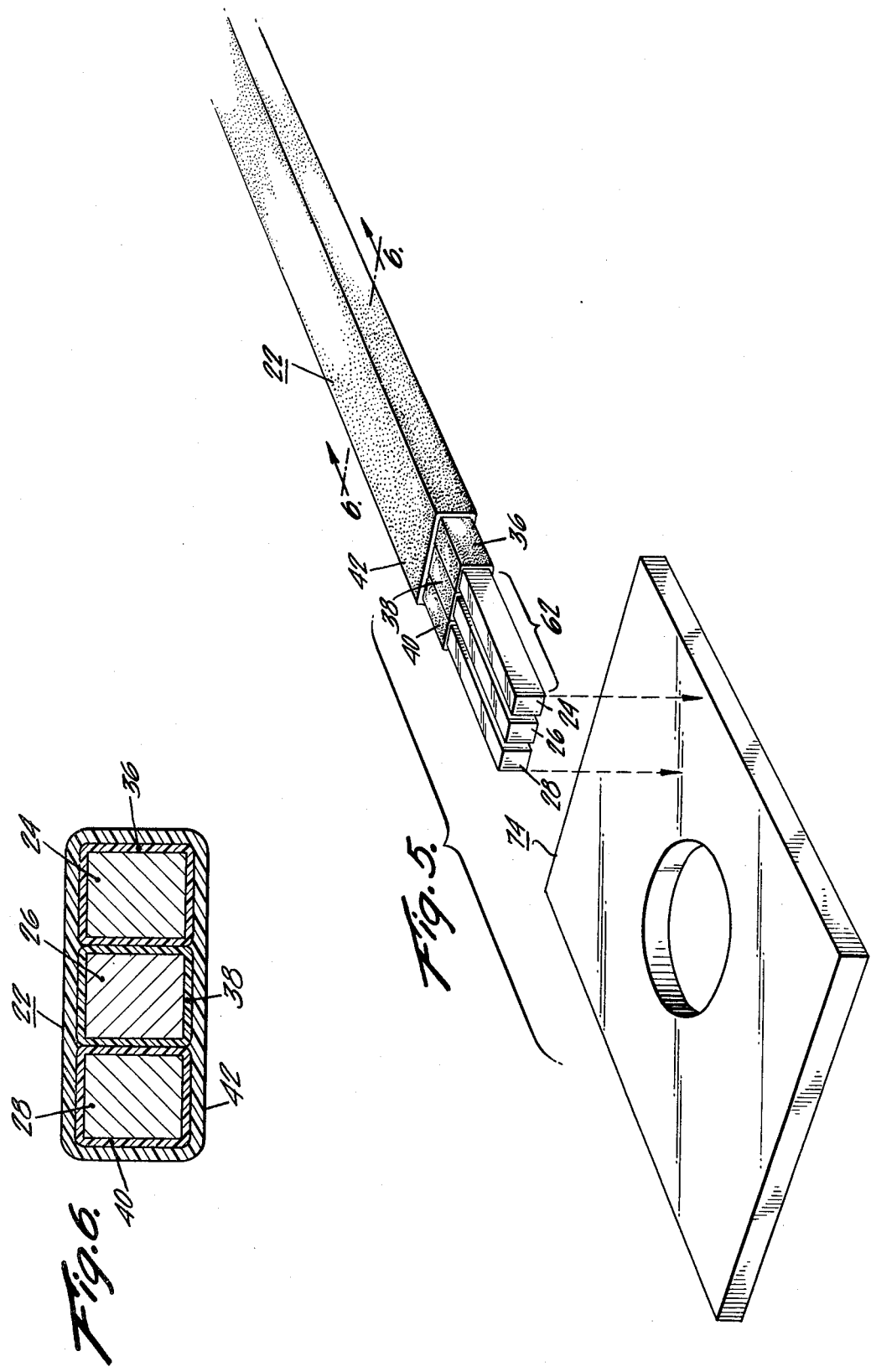

BUS CONDUIT ELECTRICAL DISTRIBUTION SYSTEM

CROSS-REFERENCES TO RELATED APPLICATIONS

This application is a continuation-in-part of my copending U.S. application Ser. No. 877,595 filed Feb. 15, 1978 for BUS CONDUIT ELECTRICAL DISTRIBUTION SYSTEM, now U.S. Pat. No. 4,213,003, which is hereby incorporated by reference and which is itself a continuation-in-part of my U.S. application Ser. No. 755,446 filed Dec. 29, 1976 for BUS TRAY ELECTRICAL DISTRIBUTION SYSTEM, now U.S. Pat. No. 4,112,249, likewise hereby incorporated by reference, and which is itself a continuation-in-part of my U.S. application Ser. No. 554,684 filed Mar. 3, 1975 for BUS TRAY ELECTRICAL DISTRIBUTION SYSTEM, which is now U.S. Pat. No. 4,008,365.

BRIEF SUMMARY OF THE INVENTION

This invention relates to a bus conduit electrical distribution system.

The present invention involves such a distribution system in which there is preferably a U-cross-sectioned tray below the bus bars and a shallow U-cross-sectioned lid over the bus bars, or vice versa, and the bus bars in different phases are on different levels, one set on one particular level for each phase,—or if for example it is a "three phase four conductor" type of circuit, then those making up each "conductor" from the standpoint of circuit arrangement are on their own level. The individual bus bars are in a plurality of groups, each group having a plurality of individual bus bars in the group, all the bus bars in the group having their cross sections arranged across one after another next to each other at the same horizontal level, and the groups likewise having their cross sections arranged across one after another next to each other at the same horizontal level, so that the cross section of all the bus bars in any one phase (or "conductor" as above stated) involves a continuous horizontal line of bus bar cross sections across one after another horizontally next to each other.

The individual bus bars in each group, which individual bus bars are called segments, throughout any one particular system will all have a cross section of the same substantially rectangular shape and the same vertical and horizontal dimensions, and in the case of any one phase (or "conductor" as indicated) their top faces will be all in the same one horizontal plane and their bottom faces all in another horizontal plane at the uniform vertical dimension below this.

In the part of the bus bar setup between joints, the bus bars in any one group are insulated from one another, preferably by having a group of three with insulation around each one, and each group is itself insulated from the other groups by insulation around it as a group. The joint box preferably is in the form of a deep inverted U-cross-sectioned member on the top and a shallow inverted U-cross-sectioned member on the bottom and within it are the bared ends of the bus bars, stopping on a line considerably short of the next sequential set of bus bars in the bus bar setup, and the gap thus left is bridged by one single plate in the case of each phase (or as indicated each "conductor" in the circuit setup in the case of a "three phase four conductor" type of circuit), the plate being of substantially the same vertical thickness as the vertical dimension of the bus bars, each of which as already indicated is of the same vertical dimension as all of the other bus bars.

In the center of this plate is a hole and between the different phases (or "conductors" as indicated) and on the outside of the whole device, at the joint are insulating plates, which in each case have a single concentric ring protruding in one vertical direction in the center and a double concentric ring protruding in the other vertical direction, with interfitting of the protruding part of the single concentric ring into the double concentric ring of the next insulating plate. A single bolt passes through the entire device by means of the hole and a single nut fastens the entire device together at the joint.

A purpose of the invention is to provide an electrical distribution system having an unusually high current-carrying capacity within safe limits for a given weight, or in other words, an unusually low weight in comparison to its safe current-carrying capacity, considering all the factors in the situation.

A further purpose of the invention is to provide an electrical distribution system which is unusually simple to make, easy to install, and generally economical.

A further purpose of the invention is to provide an electrical distribution system which requires a minimum of particular components in order to be usable for all kinds of situations.

A further purpose of the invention is to provide an electrical distribution system which can quite readily be installed to take care of one particular magnitude of load and then quite readily expanded for a greater magnitude.

A further purpose of the invention is to provide an electrical distribution system which has all sorts of advantages such as already enumerated and at the same time can readily meet all the requirements of law and appropriate standards of Underwriters or insurance in general.

Further purposes will be evident from the rest of the specification and claims.

BRIEF DESCRIPTION OF THE DRAWINGS

In the drawings I insert an exemplified showing of the invention, in the form of one particular embodiment.

FIG. 1 is a view in elevation, broken away to show a longitudinal section of this embodiment of the invention.

FIG. 2 is a plan view, broken away to show a horizontal section of this same embodiment of the invention, as shown by line 2—2 in FIG. 1.

FIG. 3 is an enlarged longitudinal section of a part of what is shown in FIG. 1, the section being taken along the line 3—3 in FIG. 2.

FIG. 4 is an enlarged cross-sectional view of the invention at a point along the busway forming a part of the invention, showing the exterior of the joint box insofar as visible behind this cross section, all as involved in line 4—4 in FIG. 1.

FIG. 5 is an enlarged perspective view of a particular group of segments of the bus bar of the invention, together with the insulation associated with these segments and the group, along with bridging connector.

FIG. 6 is a still further enlarged cross-sectional view of a particular group of bus bar segments with their insulation, the section being taken along the line 6—6 of FIG. 5.

DESCRIPTION OF THE PREFERRED EMBODIMENT

In the preferred embodiment as shown in the drawings, conduit 10 includes aluminum tray member 12, having its main portion with its cross section in the form of a deep U, but inverted, and shallow U-cross-sectioned aluminum member 14, in which the U is likewise inverted, and inside below the tray member 12 and above the shallow member 14 is the bus bar setup 20, which is held tightly between them by structural bridge setup 16, shown in FIGS. 4 and 1, utilizing bolt 18 to exert pressure from its bridge member against its channel member and thereby against the shallow member 14 and through it against bus bar setup 20. Bus setup 20 in this part of the overall arrangement has four groups of bus bars on each level of the setup, each different level representing a different one of the three phases of the current.

Each group such as 22 has three segments horizontally placed with respect to each other, such as 24, 26 and 28. The other groups such as 30, 32 and 34 are each made up of similar segments in a similar relation and the groups are horizontally placed with respect to each other. Around each segment is insulation such as 36, 38 and 40 in the case of the three segments in group 22, and around the whole set of bus bars in the given group is insulation such as 42 in the same group.

In the case of the conduit shown for example in FIG. 4, the deep U-member has a bent-back flange on each side such as flange 44 and so does the structural bridge such as flange 46 and a projection 48 on this bridge's flange, extending inward, holds the edge of the flange on the deep U-member in position.

The bolt 18 operating from its position in the structural bridge member against the underside of the channel member exerts pressure on the channel member and thereby on the bus bar setup in between the deep U-member and the shallow U-member, as already stated.

It will be noted that this is in effect an inverted form as compared to that in FIG. 2 of my U.S. application Ser. No. 877,595 already mentioned, which could perfectly well be used in this present form if desired and that my U.S. Pat. No. 4,112,249 shows in such figures as for example FIG. 1, FIG. 1A, and FIG. 17 forms of conduit which could likewise be used.

In all these and other variations, the various bus bar groups and their segments in any one phase will all have the same vertical dimension of metal, and indeed this will preferably be equally true as between the different phases. An exemplary suitable such dimension is 0.25". The group will always preferably have a crosswise dimension which is substantially greater than its vertical cross section. However, this may or may not be true of the individual segment, and a perfectly satisfactory exemplary set of segments in one particular group would be such as to give a group of 212,000 circular mills in cross-sectional area of conductor, which will be recognized to be around 0.16 square inches and would involve three segments 0.25" high and each on the order of 0.22" in width, giving a total metal width of on the order of 0.66", if we were to disregard the fact that there is a certain thickness of insulation around each segment. The actual width of it will be greater on account of the insulation and so of course will the actual height from the outside of the insulation at the top to the outside of the insulation at the bottom be greater than 0.25". However, the corresponding insulations will be the same in thickness and so the vertical heights of the bars with insulation will all be the same as each other, just as will the metal heights without insulation.

The bus bar setup in addition to passing through the conduit as part of the busway, at its ends will extend into joint boxes such as joint box 70. In these ends, a certain length 62 of the bus bar setup's end will be bare of any insulation,—both the insulation surrounding the individual bus bar segment and the insulation surrounding the group of segments, which in this embodiment is a group of 3 segments. The middlemost 64 of the 3 phases of the bus bar setup will extend straight in, whereas the uppermost phase 66 will go somewhat upward and then straight in, and the lowermost 68 will go somewhat downward and then straight in.

The joint box 70 will include a deep U-cross-sectioned element 70 and a shallow U-cross-sectioned element 72, which in the case of this specific preferred embodiment are shown with the U in each case in an inverted position, and the bus bar setup ends will be between them. Also between them will be bridging plate conductors 74, one of each of which is in broad face contact with the bus bar setup in its bared end in a position below that bared end of the bus bar setup, there thus being three such bridging conductor plates, one below and in contact with each of the phase levels of the particular bus bar setup.

This bridging plate in each case will have contact with all the individual segments of the bus bar setup of that phase in a position under those segments. The bridging plate in each case will extend on to individual similar contact with a similar phase of another bus bar setup 76 at a point further back or on in the path of the electricity.

Between these bridging plates and bus bar setups of one phase and those of another phase and on the outside of each of the outside phases are insulating plates 78 of which in this form there are four in number, two of which are respectively on the top and bottom outside, the top and bottom outside being between the top and bottom phase respectively and the outside of the joint box, such as respectively the deep-sectioned U and the shallow-sectioned U.

Each of these insulating plates is preferably rectangular, with a taper on both sides of each longitudinal end portion, as in portion 80 of the topmost insulating plate on the side toward bus bar setup 20, or more specifically, the bus bar setup whose ends are shown at 62.

In more or less the center of these insulating plates and also of the bridging conducting plates 74 and also of the outsides of the joint box both in the deep-sectioned portion 70 and the shallow-sectioned portion 72, there is a hole passing through vertically, all these holes being in registry and bolt 82 passing through the collective holes. Surrounding the hole in the case of each insulating plate is an upstanding vertical circular flange or ring 84 which protrudes upwardly from the insulating plate. Around each hole in the case of these insulating plates protrude downwardly two such vertical circular flanges or rings 86, which are spaced apart to provide a downwardly directed recess 88 which is wide and deep enough and sufficiently in registry to contain the protruding part of the upwardly extending circular flange or ring protruding from the next lower insulating plate, an example of such cooperation being that between the upwardly extending flange 90 of the next to the top insulating plate 100 and the downwardly directed recess of the top insulating plate, which is above it. This can perhaps be better seen in the somewhat enlarged detail of FIG. 3, where an intermediate insulating plate 100 has two downwardly extending circular flanges 102 and 104 and extending up between them is upwardly extending circular flange 106 of the next lower insulating plate 108.

Bolt 82 has a head 110 resting on the deep cross-sectioned U-member 70 and on the bolt is a nut 112 which by means of a washer 114 bears on a protruding member 116 surrounding the bolt and extending to and connected to the shallow-sectioned U-member 72.

As will be noted, inside the joint the bus bar setup has all its individual groups and segments ending at a single longitudinal location 120, and the same is true of the opposing bus bar setup in the joint, with the end portion 122 being of course suitably spaced from the end portion 120 to permit the holes and the respective flanges all to be in between.

Insofar as there may be varied forms of tapered insulating members in my immediately preceding application (i.e. Ser. No. 877,595) already mentioned, these may likewise be used in the present invention, although the present form is preferred in the present invention.

As will be understood from the drawings, both as found in FIG. 4 of the present application and as found in FIG. 2 of the immediately preceding application, the structural bridging setup 16 for the busway includes bridge member 132, which has flanges 46 extending upwardly at a point beyond the vertical walls of the deep-sectioned U-member and also includes channel member 134 whose top is higher than that of the end bridge member where that bridge extends across, and which channel member extends upward on either side of that bridge member to contact the shallow-sectioned member. Shank 136 of bolt 18 rides in internal thread 138 in the bridge member and thus can be screwed in to exert pressure from this bridge member on the straight channel member and thus on the shallow-sectioned U-member. The projection against which rests deep U-sectioned member in its flange enables this pressure to come from the deep-sectioned U-member and thus by means of the bolt 18 pressure is exerted on the bus bar setup by the shallow-sectioned and deep-sectioned U-members which hold it in between them. What is involved is preferably a projection against which the outside flange of the deep-sectioned U-member will bear. When the conduit setup is being put together, that flange will bend inward past this projection and then spring outward to be held by the projection. When it is desired to take the setup apart, pressure on the flange to bring it inward short of the projection will permit release of the deep-sectioned U-member and its removal, which in the case of the form of the present FIG. 4 will involve merely lifting it off the top.

The joint box will preferably also have end plates 140 at each end with openings in them, preferably located to permit the bus setup to come in or be removed when desired, and bolts and nuts such as seen for example at 142 are located in the unoccupied side part of the joint box where they will therefore not interfere with the bus bar setup, to hold the end plates onto the rest of the joint box. These plates can preferably have an opening which is more or less just sufficient in size to hold the bus bar conduit setup at that point in its insulated state and can themselves be put on or taken off when it is desired to insert or take out the bus bar setup with its opened-apart ends.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirt and scope of my claims.

Having thus described my invention, what I claim as new and desire to secure by Letters Patent is:

1. An electrical distribution system comprising:
   (a) an elongated tray and cover, both of U-cross section;
   (b) between them, but protruding beyond their ends, a set of bus bars of which has substantially the same cross section both in shape and dimensions, which cross section is substantially that of a rectangle, the bus bars including ones of different electrical phase from each other, all those of the one phase when within the tray and cover being on the one level side by side with their edges horizontally adjacent to each other and their lower and upper faces substantially on the same respective levels with each other, the bus bars in any one phase including a plurality of groups of bus bars, with each group including three individual bars, each one of the three individual bars when within the tray and cover having insulation around it and each group when within the tray and cover also having insulation around it as a group;
   (c) a metal joint box at an end of the tray and cover, the joint box also itself having a tray and cover and within it one set of ends of the bus bars in condition bare of insulation and all terminating along the one perpendicularly transverse line, with all those in any particular phase terminating at one particular level for such ends of that particular phase in side by side position;
   (d) a second tray and cover and set of bus bars having the same attributes as stated for the first such items but located on the opposite side of the joint box and having its set of bus bar ends extending in from the opposite end of the joint box to end in a perpendicularly transverse line on the other side of the first and spaced from it and the individual ends in any one phase of the one set of bus bars ending on the same horizontal level as the individual ends in the same phase of the other set of bus bars;
   (e) bridging plates within the joint box of which there is one and only one such plate for each phase and this extends across between an overlapping contacting position relative to all the bared bus bars of that phase in the one set of bus bars within the joint box and a corresponding overlapping contacting position relative to the bared bus bars of that phase in the other set of bus bars within the joint box, and each such plate having a hole in its center;
   (f) insulating plates in the joint box, one between each adjacent pair of phases and one on the outside above and below the upper and lower phases respectively, each insulating plate having a hole in its center in registry with the holes in the bridging plates and around that hole having on the one side a protruding single ridge concentric with the hole and on the other side a double ridge concentric with the hole, with the single ridge on one plate adapted to fit into the valley between the concentric ridges on the adjacent plate; and
   (g) a single bolt extending through all the holes and a single nut to cooperate with the bolt to hold everything together in the joint.

* * * * *